United States Patent [19]

Fisher et al.

[11] Patent Number: 4,802,791
[45] Date of Patent: Feb. 7, 1989

[54] REDEPLOYABLE HIGH TEMPERATURE OIL BOOM

[75] Inventors: Edward M. Fisher; Stephen M. Sanocki, both of St. Paul, Minn.

[73] Assignee: Minnesota Mining and Manufacturing Company, St. Paul, Minn.

[21] Appl. No.: 103,268

[22] Filed: Oct. 1, 1987

[51] Int. Cl.⁴ .............................................. E02B 15/04
[52] U.S. Cl. ......................................... 405/63; 405/72
[58] Field of Search .................................. 405/63–72; 210/242.1, 242.3, 923

[56] References Cited

U.S. PATENT DOCUMENTS

| 4,062,191 | 12/1977 | Preus | 405/72 |
| 4,599,013 | 7/1986 | Simpson | 405/72 |
| 4,605,586 | 8/1986 | Lane | 45/63 X |
| 4,619,553 | 10/1986 | Fisher | 405/63 |
| 4,645,376 | 2/1987 | Simpson | 405/63 |

*Primary Examiner*—David H. Corbin
*Attorney, Agent, or Firm*—Donald M. Sell; Walter N. Kirn; David W. Anderson

[57] ABSTRACT

A redeployable, high temperature oil containment boom which allows for the in-situ burning of spilled or leaked oil during offshore oil spill cleanup operations is disclosed. The boom can be used for precautionary fire containment during non-burn oil spill cleanups and can be easily recovered and redeployed.

14 Claims, 1 Drawing Sheet

U.S. Patent
Feb. 7, 1989
4,802,791
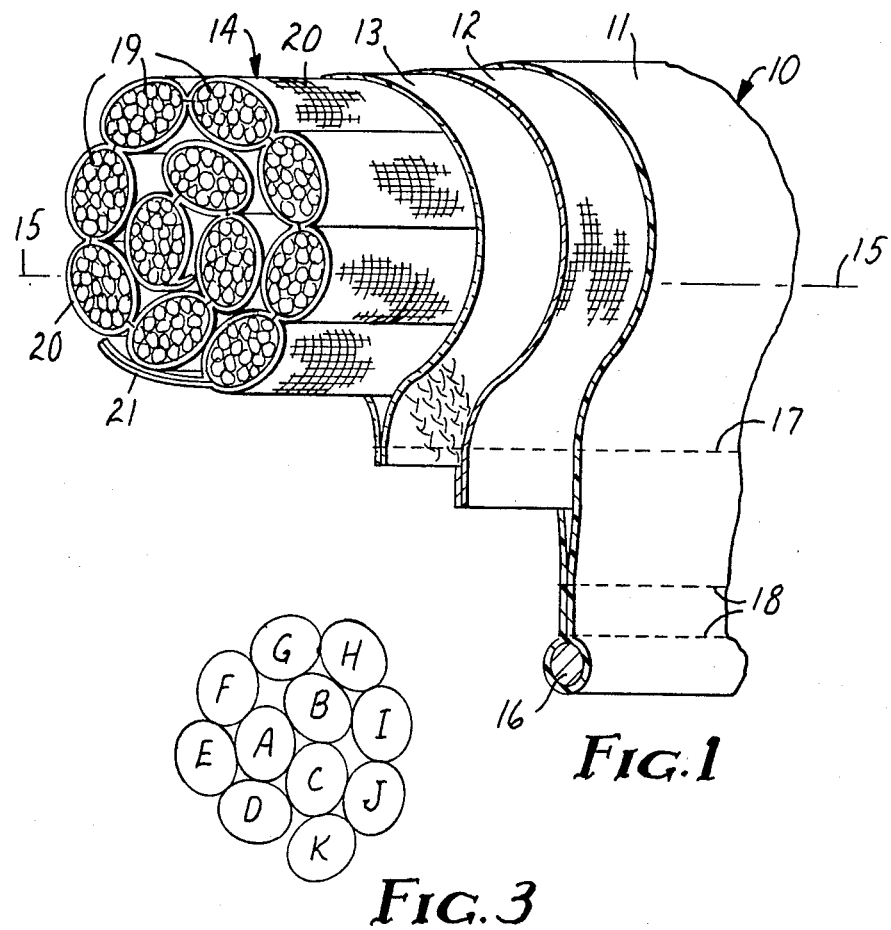
FIG.1
FIG.3
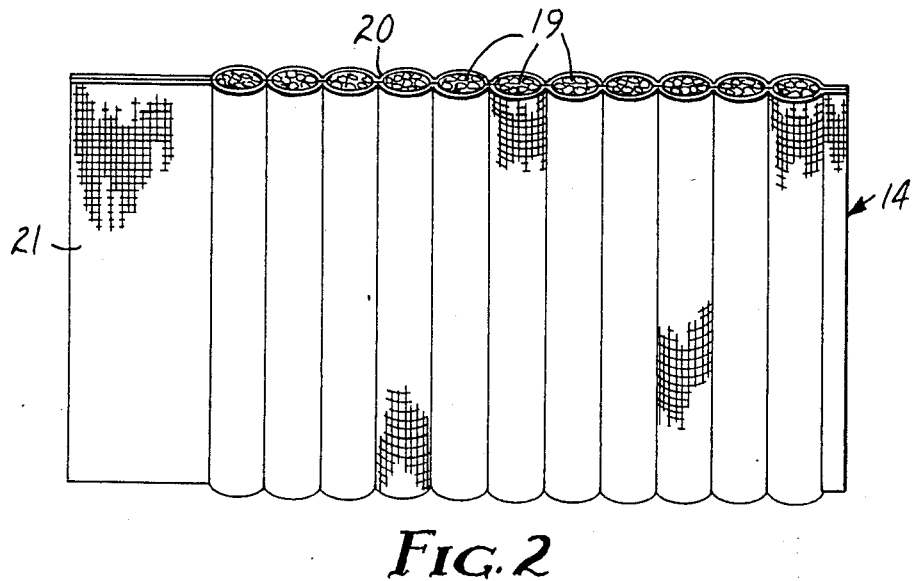
FIG.2

REDEPLOYABLE HIGH TEMPERATURE OIL BOOM

BACKGROUND OF THE INVENTION

The present invention relates to a high temperature oil containment boom which allows for the in-situ burning of spilled or leaked oil during offshore oil spill cleanup operations. In-situ burning represents one of the most effective means of eliminating large quantities of spilled oil. If conducted properly, with due consideration for the temporary reduction of air quality and the potential for exposure to fire, the in-situ burning of an oil spill can result in the least detrimental overall impact to the environment.

The remoteness of many oil exploration, production, and transportation activities (e.g. Alaska), combined with the nature of the environment, provides ideal conditions for in-situ combustion. When considered in conjunction with mechanical cleanup, chemical dispersants, and natural elimination processes, burning often provides an important option when some of the other techniques alone are impractical. For this reason, the oil industry in Alaska and Canada has conducted numerous research efforts to identify the most efficient means of burning oil in place (Shell Oil Company et al., 1983; S. L. Ross Environmental Research Limited, 1983).

Such research has revealed that oil can be ignited and combustion sustained when the oil layer on water is at least 1 to 2 mm thick. As thicknesses increase beyond this minimum value, there is less tendency for heat loss to the underlying water, and therefore the chances are greater for efficient combustion. Thick oil layers have been consistently burned with efficiencies in excess of 95%, even under arctic conditions. To achieve such success through burning, it is important to concentrate any spilled oil as quickly as possible and to contain the burning oil so that winds and/or currents can help thicken the oil slick. During the burning process, temperatures in the order of 1100° C. are common.

Conventional oil containment booms are elongated cylinders having a generally circular cross-section. These booms float in water with approximately one-third of the boom submerged below the surface of the water forming a floating barrier to the spilled oil. The booms are typically stored in a roll on the deck of a ship and deployed downwind of a spill where it floats on the surface of the water and temporarily contains the spill.

The TTI Geotechnical Resources Ltd. described a fireproof oilspill containment boom in a brochure and claimed the boom consists of alternate rigid flotation units 1.668 m long, 1.78 m high weighing 108.8 kg and flexible (accordion folded) panels 0.906 m long, 1.70 m high weighing 102 kg connected together by connectors 0.07 m long, 1.67 m high weighing 10 kg. The boom is of stainless steel construction and the maximum exposure temperature is stated to be 980° C.

Another fireproof oilspill containment boom is described in literature from Globe International Inc. A Pyroboom fireproof oil spill barrier utilizes a unique blend of refractory and metallic materials in a woven fabric coated with a high temperature polymer coating (silicone rubber). Flotation is provided by a series of stainless steel hemispheres, containing a high temperature resistant, closed cellular material. Two such hemispheres with the woven fabric enclosed between them are bolted together to form spheres 16 3/16 inches (41 cm) in diameter and spaced 34 inches (86 cm) apart at their centerlines along the length of the woven fabric. The boom has an overall height of 30 inches (76 cm) with a draft of 20 inches (51 cm) and a freeboard of 10 inches (25 cm), and weighs 8 to 10 lbs. per lineal foot (11.9 to 14.5 kg/m). The operating temperature range of the boom is stated to be −55° F. to +2400° F. (−48° C. to 1315° C.).

A fire resistant oil containment boom system designated as the SeaCurtain ReelPak FireGard Oil-Fire Containment Boom System is described in a brochure issued by Kepner Plastics Fabricators, Inc. That boom system appears to comprise compartmented circular sections containing a continuous stainless steel coil wire covered with a double walled foam containing refractory fabric with an additional portion extending downwardly from the circular section, the bottom edge of the downwardly extending section having a chain ballast member attached thereto. The boom is stored on a reel from which it is deployed. The boom is stated to have operating temperature range from −40° F. to over 2000° F. (−40° C. to 1093° C.) and, depending on model, weighs 2.2 lbs to 4.2 lbs. per lineal foot (3.3 to 6.3 kg/m).

U.S. Pat. No. 4,537,528 is directed to a fireproof boom for containing a flammable pollutant on a water surface, the boom comprising a flotation member of foamed polypropylene and at least two layers of heat-resistant, water-sorbent material surrounding the flotation member and extending into the water in the form of a depending skirt. The skirt functions to draw water up into the layers of heat-resistant material forming steam in the presence of flaming pollutant thereby allowing only the outer layer of heat-resistant material to become slightly singed. It is understood that a bottom-tensioned, cylindrical-flotation fire containment boom is manufactured by Fire Control Inc. utilizing the teachings of said patent. The boom consists of multiple layers of fire-resistant, wicking fabric positioned over steel canisters for flotation. An additional sacrificial layer and a coarse, wire-mesh barrier are used externally for abrasion resistance.

U.S. Pat. No. 4,619,553 discloses an oil boom system which utilizes a multilayered, fire-resistant blanket, and is manufactured by Minnesota Mining and Manufacturing Company (3 M Company), the assignee of the present invention. The fire-resistant blanket is used as an add-on high temperature protective blanket to convert most conventional types of booms to a containment for burning oil. The blanket is placed about the periphery of the boom and is held in position by any number of fastening systems.

Still another oil boom system provided by Minnesota Mining and Manufacturing Company (3 M), the assignee of the present invention, is a high temperature oil containment boom which allows for the in-situ burning of spilled or leaked oil. The boom comprises an outer layer of polymer coated fabric, a first underlayer of high temperature resistant refractory fabric and a second underlayer of a high or intermediate temperature resistant refractory fabric which constrains and assists in retaining the integrity of a low density, high temperature resistant core. The layers are unified by sewing with high temperature resistant, ceramic thread or by mechanical fasteners.

Problems associated with the above mentioned fire containment oil booms are that they are either difficult to recover or are not reusable and some are not redeployable in the event it was found unnecessary to burn the oil. Furthermore, those which depend upon wicking to function often can plug because of contamination by silt or salt water. These problems lead to less than desirable performance and high cost.

SUMMARY OF THE INVENTION

The present invention relates to a high temperature oil containment boom which allows for the in-situ burning of spilled or leaked oil and, in the event that the contained oil is not burned, the boom can be recovered, cleaned in the same manner as a conventional oil containment boom and stored for future deployment. The boom is capable of withstanding sustained exposure to temperatures of 1200° C., thus allowing in-situ burning of the contained oil during offshore oil spill cleanup operations. The oil boom can also be employed as a precautionary measure during traditional oilspill cleanup operations to provide protection should accidental ignition of the spilled oil occur. In this situation, the boom would, of course, be recovered and processed for redeployment.

The oil boom of the present invention comprises an outer layer of polymer coated fabric, a first underlayer of stainless steel mesh and a second underlayer of a high or intermediate temperature resistant refractory tight weave hybrid ceramic textile fabric, all of which surround and encase a cellular, high temperature resistant flotation core of inorganic spheres or granules contained and rolled in a stainless steel mesh. The layers are unified by sewing with high temperature resistant ceramic thread or mechanical fasteners.

BRIEF DESCRIPTION OF THE DRAWINGS

FIG. 1 is a perspective view, partly in section, of the oil boom of the present invention.

FIG. 2 is a plan view of the unrolled, cellular, high temperature resistant flotation core of the present invention.

FIG. 3 is a schematic view of a cross section of the boom showing the cell arrangement.

DETAILED DESCRIPTION OF THE DRAWINGS

The invention can best be understood by reference to the drawings. The high temperature oil containment boom 10 of FIG. 1 is comprised of outer layer 11 of polymer coated fabric, a first underlayer 12 of stainless steel mesh and a second underlayer 13 of high or intermediate temperature resistant, refractory tight weave hybrid ceramic textile fabric, all of which surround and encase a cellular high temperature resistant flotation core 14. Water line 15 shows that the boom 10 floats on the water with approximately one-third of the boom submerged below the surface.

Polymer coated fabric outer layer 11 is preferably nylon fabric coated with low alkali content polyvinylchloride (PVC). Other fabrics and polymer coatings may be used. Examples include polyester fabric and polyurethane coatings. Outer layer 11 of this invention allows the high temperature oil boom to be conveniently handled and function, if desired, as a conventional non-fire oil containment boom. Outer layer 11, during fire containment, melts to the water line 15 causing the underlayers 12 and 13 to be exposed to the burning oil. Outer layer 11, may also, if desired, be provided with a ballast chain pocket 16.

The first underlayer 12 is a knitted wire mesh made of stainless steel, inconel, steel, galvanized steel or other suitable alloys. A preferred knitted wire mesh is 304 stainless steel (available from Metex Corporation) having a wire diameter of about 230 micrometers with knitted opening sizes corresponding to a density of 60. The density number relates to the spacing of the needles on the knitting machine and is well known in the industry.

In order to reduce cost, high or intermediate temperature resistant refractory fabric 13 is preferably a 0.64 mm thick open mesh, tight weave, 3×3 picks/cm ceramic hybrid textile (24% ceramic/76% fiberglass) fabric woven from 1800 denier, 1.5/4 plied continuous polycrystalline ceramic fiber yarn comprising, by weight, 62% aluminum oxide, 14% boron oxide and 24% silicon dioxide (commercially available as Nextel 312 fibers and fabrics from 3 M) and texturized fiberglass. The specific fabric 13 has a basis weight of 0.414 kg/m$^2$. Other fabrics which can be used as high temperature resistant fabric 13, provided they are similarly woven, include fabrics fabricated from Nextel 440 ceramic yarn comprising, by weight, 70% aluminum oxide, 28% silicon dioxide and 2% boron oxide (3 M), Astroquartz ceramic fibers (J. P. Stevens) and leached fiberglass filaments (Hitco or Haveg) or hybrid combinations thereof.

A hybrid weave comprising Nextel and S-2 glass-/yarn was exposed to a flame test. The test was performed for two hours at both 1850° F. (1009° C.) and 2050° F. The fabric 13 did not melt in either test. The high temperature resistance of this hybrid weave would allow it to perform well as the high temperature resistant refractory fabric 13.

The high temperature resistant refractory fabric 13 may optionally be coated with a polymer coating such as a silicone rubber, a neoprene rubber or a fluorinated elastomer. The polymer coating serves to hold the yarns firmly in place during assembly and provides an abrasion resistant coating for the fabric 13 and provides protection to the fabric during shipping, storage and deployment. A particularly preferred coating for the present invention is Neoprene GN (duPont), which is applied to the fabric 13 at a coating weight of 0.16 kg/m$^2$. The coating solution is applied by dip coating the yarn while leaving the mesh interstices substantially open. The fabric 13 is thereafter allowed to dry and cure at a temperature of 160° C. before the fabric is incorporated into the boom. It will be appreciated that the polymer coating, when within areas exposed to the heat of combustion of the spilled oil, will be burned off but it will have served its processing and protection functions. Fabric 13 retains its high temperature characteristics even without polymer coating.

High temperature resistant flotation core 14, shown in unrolled plan view in FIG. 2, is preferably 3 M Macrolite Ceramic Spheres contained in a cellular roll of knitted 304 stainless steel wire mesh 20. The cellular roll is constructed by utilizing a 127 cm long and 107 cm wide piece of mesh tubing and sewing seams about every 10 cm using high temperature resistant ceramic thread or stainless steel sewing thread (2 stitches/cm). A total of 12 such seams are sewn thus producing 11 cells 19. Cutting along the upper edge opens the cells for subsequent filling with 3 M Macrolite Ceramic Spheres. 3 M Macrolite Ceramic Spheres are inert, low density spheres containing a multiplicity of minute, independent, closed air cells surrounded by a unique, tough outer shell. The spheres are impermeable to water and other fluids and, being a true ceramic, are functional at extremely high temperatures. The sphere's outer surface can be altered to provide other physical and chemical properties. Pyrofoam ceramic spheres or granules are available from High Temperature Insulation Materials, Route 14, Box 2337A, Kennewick, WA 99337. Other wire meshes such as inconel or galvanized steel or high temperature refractory ceramic fabric are also satisfactory for core 14. The filled cells are then rolled into a core and secured by fastening end tail 21 to the core with monel hog ring staples. A stainless steel knit plug or foam plug may be used to start the roll and increase the buoyancy.

Boom 10 is fabricated by layerwise assembling a composite of outer layer 11, first underlayer 12 and second underlayer 13 in registration over core 14. The thus formed composite structure is unified by sewing along line 17 using a high temperature resistant ceramic thread, stainless steel thread or suitably spaced mechanical fasteners. If desired, the outer layer 11 could also be sewn together along lines 18 providing a ballast chain pocket. In view of the fact that seam lines 18 are below water during boom use, they are preferably produced by using heavy duty nylon.

Laboratory testing has shown oil boom 10 to function as an oil containment boom and be redeployable for use in a burning operation. To further evaluate the utility of oil boom 10 under simulated use conditions, a 5 feet (1.52 m) diameter ring formed from an 8 inch (20.3 cm) diameter boom with a 12 inch (30.5 cm) skirt, was fire tested for two hours with a continuous feed heptane fire. The boom was extremely effective as a high temperature fire containment product with burning temperatures up to 1400° F. (760° C.). The stainless steel wire mesh used as underlayer 12 and in the cellular core 14 prevented rupture of the boom and loss of the contained flotation materials especially during the rough handling operations incurred in removing the boom from the water. This loss of flotation material has been a shortcoming of some prior art booms.

A lab test was performed to test the effects of a loss of flotation material from a boom. A 7½" (19 cm) diameter boom (shown in FIG. 3) containing eleven cells was tested with each cell containing a plurality of Macrolite Ceramic Spheres. The boom was initially placed in a tank of water and the percentage of surface area above the water line was calculated. A cell was thereafter cut open and the Macrolite spheres contained in that cell were removed. The above water surface area was then recalculated with the empty cell being above the water in a first test and below the water in a second test. The linear height of the boom above the water line was also measured with the empty cell being both above and below the water line. This was repeated five times until there were only six filled cells remaining. The results are tabulated below.

| # of filled cells | Identification letters of drained cells (FIG. 3) | % of boom above water with removed cells above water | % of boom above water with removed cells below water | height of boom above water with removed cells above water | height of boom above water with removed cells below water |
|---|---|---|---|---|---|
| 11 | — | 53.3% | 53.3% | 4.0" (10.2 cm) | 4.0" (10.2 cm) |
| 10 | H | 50.0 | 40.0 | 3.8 | 3.0 |
| 9 | H, I | 53.3 | 46.6 | 4.0 (10.2 cm) | 3.5 (8.9 cm) |
| 8 | G, H, I | 50.0 | 43.3 | 3.5 (8.9 cm) | 3.3 (8.4 cm) |
| 7 | F, G, H, I | 50.0 | 43.3 | 3.5 (8.9 cm) | 3.3 (8.4 cm) |
| 6 | B, F, G, H, I | 40.0 | 26.7 | 3.0 (7.6 cm) | 2.0 (5.1 cm) |

As can be seen from the above results, the boom retains a significant portion of its buoyancy even though significant amounts of the Macrolite Ceramic Spheres are removed from the boom. Thus, even if a rupture occurs wherein some flotation material is lost, the oil boom retains its buoyancy and may still be used effectively.

Although oil boom 10 has been specifically illustrated and described herein as an elongate tubular structure, a boom is typically comprised of a plurality of such elongate tubular structures joined end to end. Various modifications of the invention may readily suggest themselves and are contemplated. For example, outer layer 11 could be produced using a high temperature refractory fabric although this may increase cost and tend to reduce handleability of the boom.

What is claimed is:

1. A high temperature oil containment boom comprising an outer layer, a first underlayer of a first knitted wire mesh and a second underlayer of high or intermediate temperature resistant refractory fabric surrounding a cellular, high temperature resistant flotation core, said layers being secured together at least about their peripheral edges.

2. A high temperature oil containment boom according to claim 1 wherein said outer layer is a polymer coated fabric.

3. A high temperature oil containment boom according to claim 2 wherein the polymer coated fabric is a nylon fabric coated with low alkali content polyvinylchloride.

4. A high temperature oil containment boom according to claim 1 wherein said first knitted wire mesh is constructed of material selected from stainless steel, inconel, steel, galvanized steel, or alloys thereof.

5. A high temperature oil containment boom according to claim 1 wherein said second underlayer comprises a fabric woven from a ceramic fiber yarn or a combination of ceramic fiber yarn and fiberglass yarn.

6. A high temperature oil containment boom according to claim 5 wherein said ceramic fiber yarn comprises 62 weight percent aluminum oxide, 14 weight percent boron oxide and 24 weight percent silicon dioxide.

7. A high temperature oil containment boom according to claim 5 wherein said fabric is coated with a polymeric coating selected from silicone rubber, neoprene rubber or fluorinated elastomer.

8. A high temperature oil containment boom according to claim 1 wherein said cellular high temperature resistant flotation core is comprised of low density ceramic spheres or expanded obsidian contained in a second knitted wire mesh or high temperature refractory ceramic fabric.

9. A high temperature oil containment boom according to claim 8 wherein said second knitted wire mesh is constructed of materials comprising stainless steel, inconel, steel, galvanized steel or alloys thereof.

10. A high temperature oil containment boom according to claim 1 wherein said layers are secured together by high temperature resistant ceramic thread, stainless steel wire or mechanical fasteners.

11. A high temperature oil containment boom according to claim 1 wherein said outer layer extends distally of said flotation core, outer free end thereof being secured together to form a longitudinally extending ballast chain pocket.

12. A cellular, high temperature resistant flotation core particularly useful as a buoyancy member of an oil-containment boom, comprising:
two layers of high temperature resistant mesh sewn together with high temperature resistant thread at intervals and rolled to produce independent parallel cells tangentially adjacent one another, and
low density ceramic spheres contained within said cells to provide buoyancy.

13. A flotation core according to claim 12 wherein said wire mesh is constructed of materials comprising stainless steel, inconel, steel, galvanized steel or alloys thereof.

14. A flotation core according to claim 12 wherein said high temperature resistant thread comprises ceramic thread or stainless steel wire.

* * * * *